United States Patent [19]

MacKenzie, Jr. et al.

[11] 3,936,572

[45] Feb. 3, 1976

[54] ELECTRIC CABLE INSULATED WITH A CORONA RESISTANT POLYETHYLENE COMPOSITION CONTAINING A SILICON ADDITIVE

[75] Inventors: Burton Thornley MacKenzie, Jr., Monroe; Charles Frank Wallace, Jr., Fairfield, both of Conn.

[73] Assignee: General Electric Company, New York, N.Y.

[22] Filed: Nov. 30, 1973

[21] Appl. No.: 420,515

Related U.S. Application Data

[60] Division of Ser. No. 246,153, April 21, 1972, Pat. No. 3,795,646, which is a continuation of Ser. No. 794, Jan. 5, 1970, abandoned.

[52] U.S. Cl. ....... 428/379; 174/110 PM; 174/110 S; 427/117; 427/120; 428/461; 428/463
[51] Int. Cl.² ..................... B32B 15/08; H01B 17/62
[58] Field of Search ...... 117/232, 161 UH, 161 ZA; 260/29.1 SB, 37 SB; 427/117, 120; 428/379, 461, 463; 174/110 PM, 110 S

[56] References Cited
UNITED STATES PATENTS

| | | | |
|---|---|---|---|
| 2,888,419 | 5/1959 | Safford | 260/29.1 R |
| 2,930,083 | 3/1960 | Vostovich et al. | 264/174 |
| 3,148,169 | 9/1964 | Martens et al. | 260/42.15 |
| 3,171,866 | 3/1965 | Meyer et al. | 117/232 X |
| 3,425,983 | 2/1969 | Wolfe | 260/42.15 X |
| 3,795,646 | 3/1974 | MacKenzie et al. | 260/29.1 SB |
| 3,802,913 | 4/1974 | MacKenzie | 117/232 |

*Primary Examiner*—Harry J. Gwinnell
*Attorney, Agent, or Firm*—Raymond G. Simkins; Philip L. Schlamp; Frank L. Neuhauser

[57] ABSTRACT

A curable composition, especially adaptable for use as insulation for wire and cable, comprising an ethylene-containing polymeric member, a curing agent, and a silicone fluid having a viscosity not greater than about 100 centistokes at 25°C. A filler such as carbon black or a mineral filler may be incorporated into the system.

13 Claims, No Drawings

ELECTRIC CABLE INSULATED WITH A CORONA RESISTANT POLYETHYLENE COMPOSITION CONTAINING A SILICON ADDITIVE

This is a division of application Ser. No. 246,153, filed April 21, 1972, now U.S. Pat. No. 3,795,646 which is a continuation of application Ser. No. 794, filed Jan. 5, 1970, now abandoned.

This invention relates to an improved insulating composition. In its more specific aspect, this invention relates to an ethylene polymeric composition useful as insulation characterized by improved ionization resistance, and to electric wire and cable insulated with such a composition.

Thermosetting or cross-linked polyolefin compositions, such as polyethylene, are well-known and have been used extensively, especially for insulation materials for wire and cable. In the conventional manufacture of wire and cable employing such insulation materials, the curing agent, filler and/or other additives are incorporated into the polymer. The compounded admixture is subsequently fabricated over a metallic conductor as an insulation coating and then cured at an elevated temperature to form a thermosetting or cross-linked coating. Where desired, the curing agent may be omitted, and the fabricated coating can be cross-linked by irradiation. Cross-linked polyolefins are gaining wide use elsewhere such as for expandable tube for splicing, for molded parts and for laminates.

Cross-linked ethylene-containing polymeric compositions as a general rule exhibit excellent physical properties and electrical properties such as a high hot tensile strength and a low dielectric losses, but this might be varied depending upon other ingredients. The growth of this material as cable insulation has been rapid, but more recent demands for higher voltage cable require even superior properties because of the high voltage stress placed upon the cable. In power cable applications for transmitting relatively high voltage loads such as 5kV and above, ionization resistance, sometimes referred to as corona resistance, may become a problem because it may lead to the premature breakdown of the cable insulation. However, known cross-linked polyethylene compositions, for example, have an ionization resistance level which is observed under a high voltage stress. Actually, the ionization resistance values for these compositions are extremely erratic in that the same sample can exhibit widely divergent values. Consequently, an average value is usually cited for the particular composition. Various additives to the polymeric systems for the purpose of improving ionization resistance have been investigated, but have met with little or no success. Most notably, these additives have included silicone gums or rubbers which have a relatively high viscosity, i.e., 1,000,000 centistokes at 25°C. In the polymeric systems, the silicone gums are curable and have substantially no effect on ionization resistance unless used in relatively large quantities, e.g., 15 parts per 100 parts of polymer, and have an adverse effect on the mixing characteristics.

The invention has therefore as its object to provide ethylene-containing polymeric compositions which exhibit improved ionization resistance under high voltage stress while not adversely effecting or altering the other properties of the composition. Other objects and advantages of the invention will become evident from the following description.

In accordance with the broad aspect of this invention, there is provided a curable composition, especially useful as insulating material for wire and cable, comprising an ethylene-containing polymer, a curing agent for effecting cross-linking of the polymer, and an organic silicone fluid having a viscosity not greater than 100 centistokes at 25°C. Where desired, a filler such as carbon black or a mineral filler may be incorporated into the polymeric system. In preparing the composition, the polymer, silicone fluid, and filler and other additives, where desired, are intimately admixed as in a Banbury at an elevated temperature sufficient to flux or plasticize the polymer. A suitable curing agent, desirable a tertiary peroxide, is then incorporated into the admixture, and blending is contained below the incipient cure temperature of the curing agent. The composition is subsequently fabricated as by molding or as by extrusion over a conductor to provide an insulation layer, and then cured to form a thermosetting or cross-linked product. In the manufacture of cable, it is conventional to pass the extruded product through a curing oven operated under steam pressure of about 225 to 250 p.s.i.g. where cross-linking of the polymer takes place. The cured product exhibits substantially improved ionization resistance under a high voltage stress without any adverse effect or loss in the other properties, which is discussed herein below in greater detail.

The terms "wire" and "cable" are used herein and in the appended claims as synonymous terms to refer to insulated conductors.

It was unexpected to find that the incorporation of a small amount of the silicone fluid into the polymeric system enhanced considerably the ionization resistance of the cured product. Moreover, the polymeric system made in accordance with the present invention yields relatively consistent ionization resistant values as compared to erratic and extremely divergent measurements obtained on substantially the same polymeric system but containing no such silicone fluid. Consequently, the measurements on compositions of our invention are more meaningful. The silicone fluid should have a viscosity not greater than about 100 centistokes at 25°C, and preferably not greater than about 50 centistokes, because there is a rather sharp decline in the improvement obtained with higher viscosity silicone fluids, and soon reaches a point where there is little or no improvement. Silicone fluids having a viscosity from about 5 to 100 centistokes are especially useful, and cross-linked polyethylene, for example, containing this silicone fluid have shown an increase in ionization resistance by a factor greater than 10 and sometimes 20. The amount of silicone fluid incorporated into the polymeric system should be sufficient to result in a marked improvement in ionization resistance, but this may vary somewhat depending upon the particular polymer and filler. In general, the amount of silicone fluid should be at least 2 parts by weight per 100 parts polymer, although as little as 1 part by weight has shown substantial beneficial results. Ethylene-containing polymeric systems containing from about 2 parts to 5 parts by weight silicone fluid per 100 parts of polymer, and preferably about 2 to 3 parts, are especially suitable, and there appears to be no beneficial effect in using increased amounts, although this may depend somewhat upon the particular polymer and filler.

The silicone fluids used in this invention are well-known and are frequently referred to as organopolysiloxanes having a general structural formula

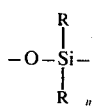

where R is an organic radical such as a lower alkyl, carboxyalkyl, hydroxyalkyl, alkenyl, aryl, and aralkyl radicals, and n is the number of units in the chains. In the preferred embodiment, R is a methyl and/or phenyl racical and the silicone fluid has from about 1.9 to 2.1 silicon-bonded organic groups per silicon atom. Suitable silicone fluids include, for example, dimethylpolysiloxane, methylphenylpolysiloxane, and methylvinylpolysiloxane.

The curable polymer included within the scope of the present invention comprises an ethylene-containing polymeric member selected from the group consisting of polyethylene, blends of polyethylene and other polymers, and copolymers of polyethylene and other polymerizable materials. Suitable copolymers include, for example, ethylene-vinyl acetate, ethylene-propylene copolymer and ethylene-propylene ter-polymer. The polyethylene may be blended, for example, with vinyl acetate, ethylacrylate, propylene, butene-1 as well as with other copolymers such as ethylene-propylene or ethylene-vinyl acetate. The blend or copolymer should comprise not less than about 50% by weight ethylene, and more generally about 70 to 90% by weight ethylene, the balance being the other polymeric material, but this will depend largely upon the properties desired for the end product. Although the invention is described hereafter with specific reference to polyethylene, it should be understood that blends or copolymers of ethylene are also useful.

Although the invention has been described with particular emphasis on filled polymeric systems, it should be understood that the invention is also intended to include unfilled systems as well. Thus, both filled and unfilled cross-linked polyethylene systems have been employed as insulation for high voltage cable, and it has been found that the incorporation of a small amount of silicone fluid in accordance with the present invention substantially improves the corona resistance of the cured product. Where desired, a suitable filler is compounded with the polymer and other additives. The fillers utilized in the composition may be any of those commonly employed in polymeric compositions and include the various carbon blacks and mineral fillers. The mineral fillers useful in the invention include, for example, aluminum silicate, aluminum oxide, calcium silicate, silica, magnesium silicate, titanium dioxide and mixtures thereof. These filler materials are well-known and readily available on the market, and the type of filler used will depend largely on the desired properties for the product and may be determined by one skilled in the art. The function of fillers in these polymeric systems is well-known, and the amount of filler incorporated into the composition may be varied depending upon the properties desired in the cured product. The filler content may range from about 20 to 50% by weight of the composition, and more preferably about 25 to 40% by weight.

The compounding operation is conducted within a temperature range high enough to render the admixture sufficiently plastic to work, but below the reacting temperature or decomposition temperature of the curing agent so that the curing agent will not decompose thereby causing at least partial or incipient curing of the polyethylene stock during the normal mixing cycle. Desirably, the curing agent employed in the operation is an organic peroxide, such as a tertiary peroxide, and characterized by at least one unit of the structure

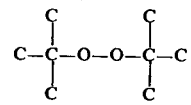

which decomposes at a temperature in excess of about 295°F. The use of these peroxide curing agents in effecting cross-linking of polymers such as polyethylene compounds is adequately described in U.S. Pat. Nos. 3,079,370, 2,888,424, 3,086,966 and 3,214,422, which patents are incorporated in this specification by reference. The most commonly used peroxide curing agent, and the agent preferred, is di-$\alpha$-cumyl peroxide. Other useful curing agents include the tertiary diperoxides such as 2,5-dimethyl-2,5-di(t-butyl peroxy) hexane and 2,5-dimethyl-2,5-di(t-butyl peroxy) hexyne-3, and the like diperoxy and polyperoxide compounds.

The proportion of peroxide curing agent used depends largely on the mechanical properties sought in the cured product, for example, hot tensile strength. A range of from about 0.5 to 10 parts by weight of peroxide per hundred parts of polymer satisfy most requirements, and the usual proportion is of the order of two to four parts peroxide. In a typical production operation employing a tertiary peroxide as a curing agent, compounding is conducted at a temperature of from about 200° to 275°F. If compounding is conducted at a temperature much higher than the stated maximum, the peroxide will decompose thereby causing premature curing of at least a portion of the polymer. As a consequence, the compound will be difficult to fabricate and the final product will exhibit an irregular or roughened surface.

Also, certain additives whose function are well-known are usually compounded with the polymeric blend. These compounding additives include, for example, an antioxidant such as polymerized trimethyldihydroquinoline, a lubricant such as calcium stearate to prevent the composition from sticking during fabrication, a non-combustible additive such as antimony oxide to provide flame retardance, a coagent such as polybutadiene to facilitate cross-linking, and a small amount of pigment or coloring agent. The compounding additives required may vary considerably, and there may be others than those mentioned depending upon the properties sought for the end product. These additives are normally admixed with the polymer and filler as in a Banbury to form a substantially homogeneous admixture.

In the following examples which further illustrate the invention, the samples were prepared, including the controls containing no silicone fluid, on a two-roll rubber mill according to the following procedure: the polymer, filler, silicone fluid and other additives were first admixed on the rubber mill at a temperature of about 225°F for about 4 – 5 minutes. The di-$\alpha$-cumyl-peroxide curing agent was added and mixing continued for another 2 minutes. The compounded composition was then stripped from the mill and cooled to room temperature. For each compound, panels measuring 6in. × 6in. × 10mils were molded between parallel platens for twenty minutes at 350°F under a pressure of 85 tons thereby cross-linking the panels. The press was then cooled to room temperature, and the molded panel removed. A sample two inches in diameter was cut from each molded panel. The recipes for the samples are shown in Table I below for examples 1 – 9.

Each sample was tested for corona resistance according to the procedure set forth in A.I.E.E. Transactions, "Progressive Stress — A New Accelerated Approach to Voltage Endurance", W. T. Starr and H. S. Endicott, Vol. 80, 1961, Part III, Power Apparatus and Systems.

From the table it will be observed that silicone fluids having viscosities not greater than 100 centistokes substantially improve the ionization resistance of the cured product. As shown, a cured sample containing no silicone fluid had an average ionization life of 369 minutes whereas the addition of three parts of silicone fluid having a viscosity of 50 centistokes showed an ionization life greater than 5800 minutes.

Table II, below, shows the results obtained with varying concentrations of dimethylpolysiloxane; and Table II, below, shows the results obtained with an unfilled polymeric system and polymeric systems with different fillers.

TABLE II

| CONCENTRATION EFFECT | | | | |
|---|---|---|---|---|
| Example No. | 10 | 11 | 12 | 13 |
| Polyethylene | 100 | 100 | 100 | 100 |
| Aluminum silicate | 50 | 50 | 50 | 50 |
| Polymerized trimethyldihydroquinoline (antioxidant) | .5 | .5 | .5 | .5 |
| Di-α-cumylperoxide 90% active (curing agent) | 3.5 | 3.5 | 3.5 | 3.5 |
| Dimethylpolysiloxane (50 ctks., 25°C) | — | 3 | 1 | .25 |
| Ionization resistance | 298 | >5800 | 387 | 369 |

TABLE III

| FILLED AND UNFILLED CROSS-LINKED POLYETHYLENE SYSTEMS | | | | | | | | | | |
|---|---|---|---|---|---|---|---|---|---|---|
| Example No. | 14 | 14A | 15 | 15A | 16 | 16A | 17 | 17A | 18 | 18A |
| Polyethylene | 100 | 100 | 100 | 100 | 100 | 100 | 100 | 100 | 100 | 100 |
| Carbon black | — | — | 40 | 40 | — | — | — | — | — | — |
| Magnesium silicate | — | — | — | — | 30 | 30 | — | — | — | — |
| Hydrated alumina | — | — | — | — | — | — | 30 | 30 | — | — |
| Titanium dioxide | — | — | — | — | — | — | — | — | 30 | 30 |
| Polymerized tri-methyldi-hydroquinoline (antioxidant) | 1 | 1 | 1.5 | 1.5 | .5 | .5 | .5 | .5 | .5 | .5 |
| Di-α-cumylperoxide 90% active (curing agent) | 2 | 2 | 3.11 | 3.11 | 3.5 | 3.5 | 3.5 | 3.5 | 3.5 | 3.5 |
| Dimethylpolysiloxane (20 ctks., 25°C) | — | 3 | — | — | — | — | — | — | — | — |
| (50 ctks., 25°C) | — | — | — | 3 | — | 3 | — | 3 | — | 3 |
| Ionization resistance | 364 | >1500 | 705 | 1536 | 298 | >1146 | 268 | 847 | 186 | 1440 |

The test apparatus was modified to provide a fuse wire extending from the bottom electrode to ground so that when the sample failed, the fuse wire broke. The ionization resistance is shown in Table I below for examples 1 – 9.

In Table III, for each Example, the number without the letter is the control and the number followed by the letter A included the silicone fluid. Thus, the addition of the silicone fluid substantially increased the ionization resistance of the cured polymer.

Table IV, below, illustrates the beneficial results obtained when using copolymers.

TABLE I

| SILICONE FLUIDS OF VARYING VISCOSITIES IN POLYETHYLENE SYSTEMS (ctks. at 25°C) | | | | | | | | | |
|---|---|---|---|---|---|---|---|---|---|
| Example No. | 1 | 2 | 3 | 4 | 5 | 6 | 7 | 8 | 9 |
| Polyethylene | 100 | 100 | 100 | 100 | 100 | 100 | 100 | 100 | 100 |
| Aluminum silicate | 50 | 50 | 50 | 50 | 50 | 50 | 50 | 50 | 50 |
| Polymerized tri-methyldihydroquinoline (antioxidant) | .5 | .5 | .5 | .5 | .5 | .5 | .5 | .5 | .5 |
| Di-α-cumylperoxide 90% active (curing agent) | 3.5 | 3.5 | 3.5 | 3.5 | 3.5 | 3.5 | 3.5 | 3.5 | 3.5 |
| Dimethylpolysiloxane 5 ctks. | 3 | | | | | | | | |
| 20 ctks. | | 3 | | | | | | | |
| 50 ctks. | | | 3 | | | | | | |
| 100 ctks. | | | | 3 | | | | | |
| 350 ctks. | | | | | 3 | | | | |
| 1000 ctks. | | | | | | 3 | | | |
| 5000 ctks. | | | | | | | 3 | | |
| 3000 ctks. | | | | | | | | 3 | |
| Control (no silicone fluid) | | | | | | | | | — |
| Ionization resistance (500 volts per mil average stress) | >1446 | >1446 | >5800 | 828 | 292 | 322 | 262 | 441 | 369 |

TABLE IV

| Example No. | COPOLYMERS | | | |
|---|---|---|---|---|
| | 19 | 19A | 20 | 20A |
| Ethylene-vinyl acetate | 100 | 100 | — | — |
| Ethylene-propylene copolymer | — | — | 100 | 100 |
| Polymerized trimethyldihydroquinoline (antioxidant) | .5 | .5 | 2 | 2 |
| Di-α-cumylperoxide 90% active (curing agent) | 3.5 | 3.5 | 3 | 3 |
| Aluminum silicate | 50 | 50 | 100 | 100 |
| Miscellaneous additives | — | — | 16.5 | 16.5 |
| Dimethylpolysiloxane (50 ctks., 25°C) | — | 3 | — | 3 |
| Ionization resistance | 255 | >1990 | 576 | >1629 |

Here, again, a comparison of the controls with the sample prepared in accordance with the invention shows an increase in ionization resistance for the latter.

What we claim as new and desire to secure by Letters Patent of the United States is:

1. An electric cable which comprises a metallic conductor and a thermosetting insulation having improved resistance to corona surrounding said conductor, said thermosetting insulation consisting of:
   a. a polymeric member containing not less than 50% by weight of ethylene selected from the group consisting of polyethylene, blends of polyethylene and other polymers, and copolymers of ethylene and other polymerizable material selected from the group consisting of propylene and vinyl acetate; and
   b. a silicone fluid having a viscosity not greater than 100 centistokes at 25°C in an amount of about 2 to about 5 parts by weight per 100 parts by weight of polymeric material.

2. An electric cable according to claim 1 wherein said insulation includes a filler.

3. An electric cable according to claim 2 wherein said polymeric member is polyethylene.

4. An electric cable comprising a metallic conductor and a thermoset insulation having improved resistance to corona surrounding said conductor, said thermoset insulation consisting of the cured product of:
   a. a polymeric member containing not less than about 50 by weight of ethylene selected from the group consisting of polyethylene, blends of polyethylene and other polymers, and copolymers of ethylene and other polymerizable materials selected from the group consisting of propylene and vinyl acetate;
   b. a peroxide curing agent for effecting cross-linking of said polymeric member; and
   c. a silicone fluid having a viscosity not greater than about 100 centistokes at 25°C present in the range of from about 2 to 5 parts by weight per 100 parts by weight of polymeric material.

5. The thermoset insulation according to claim 4, wherein said polymeric member is ethylene-propylene.

6. The thermoset insulation according to claim 4, wherein said polymeric member is ethylene-vinyl acetate.

7. The thermoset insulation according to claim 4, including a filler.

8. The thermoset insulation according to claim 4, wherein said silicone fluid has a viscosity of about 50 centistokes at 25°C.

9. The thermoset insulation according to claim 4, wherein the peroxide curing agent is an organic peroxide.

10. An electric cable comprising a metallic conductor and a thermoset insulation having improved resistance to corona surrounding said conductor, said thermoset insulation consisting of the cured product of polyethylene, an organic peroxide curing agent, and a silicone fluid having a viscosity not greater than 100 centistokes at 25°C and present in the range of about 2 to 5 parts by weight of polyethylene.

11. The electric cable of claim 10, wherein the thermoset insulation includes a filler.

12. The electric cable of claim 10, wherein the silicone fluid is selected from the group consisting of dimethylpolysiloxane, methylphenylpolysiloxane and methylvinylpolysiloxane.

13. The electric cable of claim 10, wherein the silicone fluid has a viscosity of not greater than about 50 centistokes at 25°C.

* * * * *